United States Patent
DeMarco (10) Patent No.: US 7,410,446 B2
(45) Date of Patent: Aug. 12, 2008

(54) OIL WARMING STRATEGY FOR TRANSMISSION

(75) Inventor: Frank A. DeMarco, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 267 days.

(21) Appl. No.: 11/305,185

(22) Filed: Dec. 19, 2005

(65) Prior Publication Data

US 2007/0142168 A1 Jun. 21, 2007

(51) Int. Cl.
*F16H 47/08* (2006.01)

(52) U.S. Cl. .......................................... 477/98

(58) Field of Classification Search ............... 477/98, 477/68; 475/72, 117
See application file for complete search history.

(56) References Cited

U.S. PATENT DOCUMENTS

| | | | |
|---|---|---|---|
| 3,038,353 A | 6/1962 | Roche | |
| 4,678,069 A | 7/1987 | Yoshimura et al. | |
| 4,754,664 A | 7/1988 | Dick | |
| 4,894,780 A * | 1/1990 | Simonyi et al. | 701/62 |
| 5,069,084 A | 12/1991 | Matsuno et al. | |
| 5,115,694 A | 5/1992 | Sasaki et al. | |
| 5,131,293 A * | 7/1992 | Kaiser et al. | 477/98 |
| 5,159,855 A | 11/1992 | Nikolaus et al. | |
| 5,199,326 A | 4/1993 | Iwatsuki et al. | |
| 5,692,991 A | 12/1997 | Iwata et al. | |
| 5,803,863 A | 9/1998 | Hayward et al. | |
| 5,868,640 A * | 2/1999 | Coutant | 475/72 |
| 5,890,981 A * | 4/1999 | Coutant et al. | 475/72 |
| 6,056,657 A * | 5/2000 | Garnett | 475/72 |
| 6,203,463 B1 * | 3/2001 | Casey et al. | 475/72 |
| 6,244,232 B1 | 6/2001 | Ban et al. | |
| 6,440,039 B1 * | 8/2002 | Warren | 477/86 |
| 7,168,997 B2 * | 1/2007 | Ohtsuki | 440/75 |

FOREIGN PATENT DOCUMENTS

| | | |
|---|---|---|
| DE | 101 28 856 | 5/2002 |
| DE | 102 37 415 | 3/2004 |
| DE | 103 42 893 | 5/2005 |
| GB | 2354294 | 3/2001 |
| JP | 61-191434 | 8/1986 |

* cited by examiner

*Primary Examiner*—Dirk Wright
(74) *Attorney, Agent, or Firm*—Finnegan, Henderson, Farabow, Garrett & Dunner (57) ABSTRACT

A method is provided for increasing a temperature of oil in a continuously variable transmission during engine start-up, the transmission including a fluid pump and motor, and a mechanical transmission. The method includes starting the engine, maintaining the fluid pump at substantially zero displacement, and heating the transmission oil by relative rotation of a first clutch disc and first clutch hub of a first clutch assembly and by relative rotation of a second clutch disc and second clutch hub of a second clutch assembly. The method further includes maintaining a substantially zero net torque from the transmission during the heating of the oil by the first and second clutch assemblies.

19 Claims, 6 Drawing Sheets

OIL WARMING STRATEGY FOR TRANSMISSION

TECHNICAL FIELD

The present disclosure relates generally to an oil warming strategy for a transmission, and more particularly, to an oil warming strategy for a hydromechanical transmission.

BACKGROUND

Hydraulic fluid, e.g., oil, in a transmission typically has a low temperature, e.g., −10° C., under cold start conditions. At such a low temperature, there is increased flow resistance owing to an increased viscosity of the oil. As a result, the magnitude of the load imposed on the engine is substantially great. Furthermore, stroking a variable displacement pump in the transmission to maximum displacement under such conditions can damage the pump. Specifically, because maximum displacement from the pump is required to engage the clutches, at zero ground speed the machine cannot move until the oil is warm enough to stroke to maximum displacement.

Methods for warming oil in a transmission under cold start conditions are well known. One method of warming the oil in a transmission is described in U.S. Pat. No. 5,115,694 (the '694 patent) issued to Sasaki et al. The '694 patent describes a warming-up operation for an engine in a transmission that starts in cold conditions. Hydraulic fluid, e.g., oil, is supplied from a pump driven by the engine to a hydraulically actuatable coupling of the transmission, i.e., clutches and brakes, for varying a gear ratio of the transmission. If the temperature of the oil in the transmission is below a predetermined threshold, then the hydraulic pressure of the oil supplied by the pump is decreased temporarily to a minimum value. Since the magnitude of the line pressure is temporarily decreased, the load on the engine imposed by the pump is decreased and the oil may be subsequently warmed up. After temporarily decreasing the line pressure to warm the oil, the line pressure may be increased to a maximum value.

Although the warm-up strategy of the '694 patent may warm the oil in the transmission under cold start conditions, the '694 patent warms the oil by decreasing line pressure in the oil supply, thereby decreasing the amount of oil circulating in the transmission.

The disclosed system is directed to overcoming one or more of the problems set forth above.

SUMMARY OF THE INVENTION

In one aspect, the present disclosure is directed to a method for increasing a temperature of oil in a continuously variable transmission during engine start-up, the transmission including a fluid pump and motor, and a mechanical transmission. The method includes starting the engine, maintaining the fluid pump at substantially zero displacement, and heating the transmission oil by relative rotation of a first clutch disc and first clutch hub of a first clutch assembly and by relative rotation of a second clutch disc and second clutch hub of a second clutch assembly. The method further includes maintaining a substantially zero net torque from the transmission during the heating of the oil by the first and second clutch assemblies.

In another aspect, the present disclosure is directed to a method for increasing a temperature of oil in a continuously variable transmission during engine start-up, the transmission including a fluid pump and motor, and a mechanical transmission. The method includes starting the engine, incrementally increasing the displacement of the fluid pump in response to a first set of predetermined conditions, and incrementally increasing the speed of the engine in response to a second set of predetermined conditions. The method further includes maintaining a substantially zero net torque from the transmission during the incremental increasing of the displacement of the fluid pump and speed of the engine.

DETAILED DESCRIPTION

Figure 1:
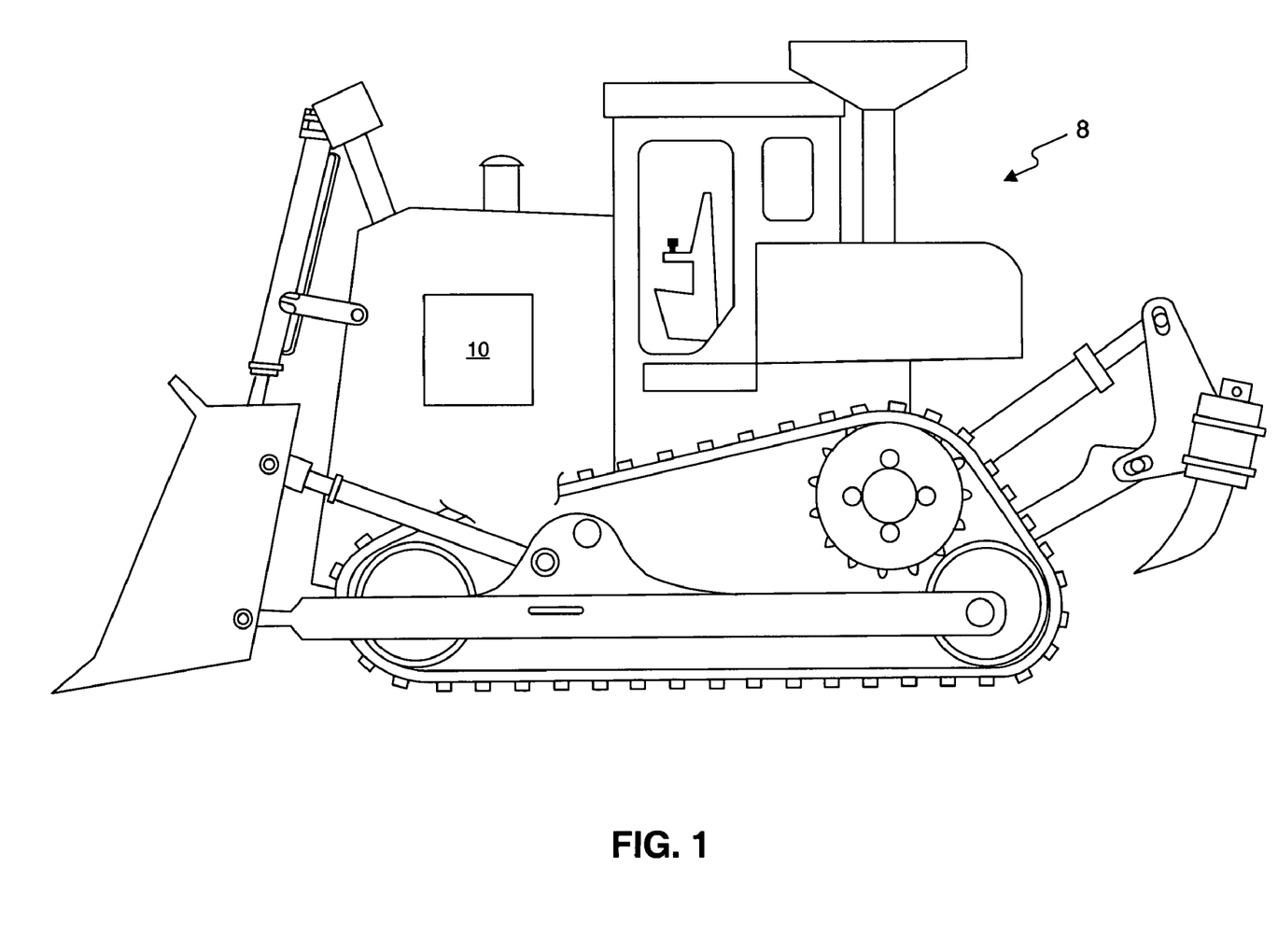
FIG. 1 is a diagrammatic illustration of an exemplary disclosed work machine.

FIG. 1 illustrates an exemplary work machine 8 having an exemplary continuously variable transmission. The work machine 8 may embody a fixed or mobile machine that performs some type of operation associated with an industry such as mining, construction, farming, transportation, or any other industry known in the art. For example, the work machine 8 may be an earth moving machine such as an excavator, a dozer, a loader, a backhoe, a motor grader, a dump truck, or any other earth moving machine.

Figure 2:
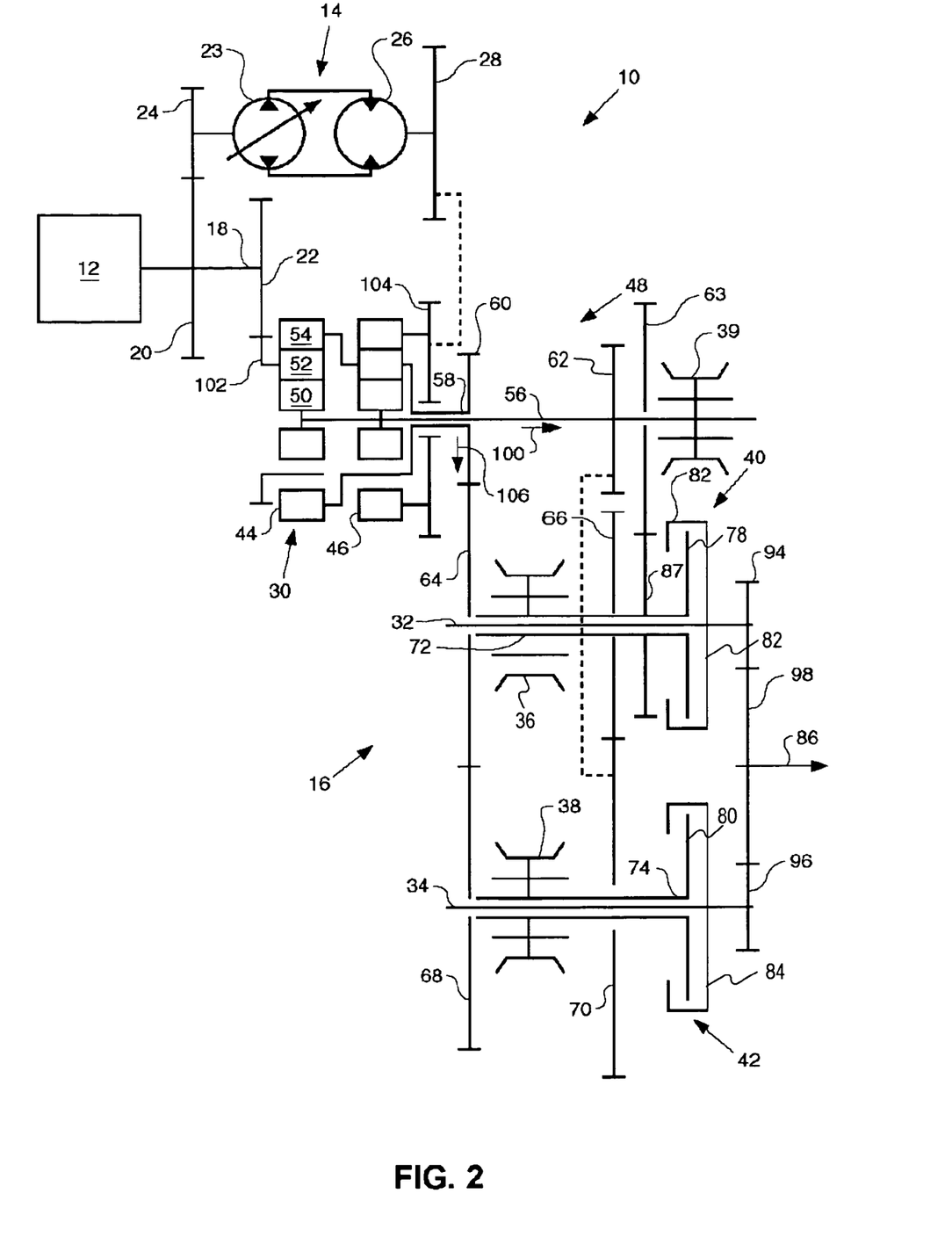
FIG. 2 is a schematic view of an exemplary disclosed hydromechanical transmission of the work machine of FIG. 1.
Figure 3:
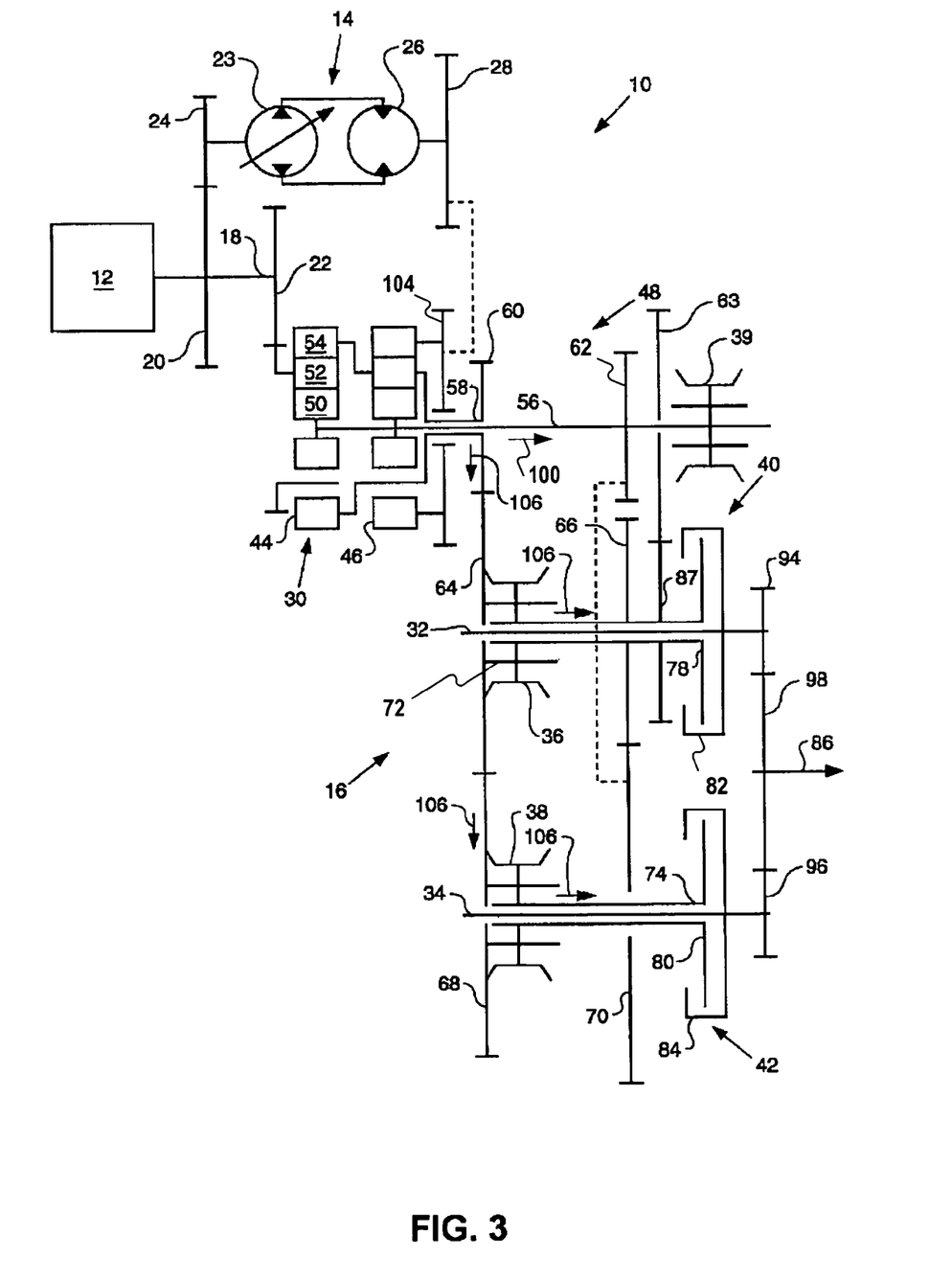
FIG. 3 is a schematic view of the hydromechanical transmission of FIG. 2 with a first synchronizer at a low-reverse position and a second synchronizer at a low-forward position.

FIGS. 2 and 3 illustrate schematic views of the exemplary continuously variable transmission 10 in two different settings, which are described below. The components of the transmission 10 are surrounded by oil, and the oil can be circulated throughout the transmission 10 using a pump (not shown).

The continuously variable transmission may be a hydromechanical transmission 10 having a mechanical transmission 16 and a hydraulic variator in the form of a hydrostatic transmission (pump and motor) 14. An engine 12 drives the hydromechanical transmission 10, and may be an internal combustion engine, however, it may be any kind of device capable of powering the continuously variable transmission as described herein. The engine 12 outputs to the hydrostatic transmission 14 and the mechanical transmission 16 through an input member 18.

The input member 18 provides split power to the hydrostatic transmission 14 and the mechanical transmission 16 through first and second fixed input gears 20 and 22. The term "fixed" may be understood as being integral with, permanently attached, interconnected through a splined connection, or fused by welding, for example, or by any other means known to those having ordinary skill in the art.

The hydrostatic transmission 14 includes a variable displacement pump 23, such as a fluid pump, drivingly connected to the engine 12, through a hydrostatic transmission input gear 24, and a motor 26, which outputs through a hydrostatic transmission output gear 28 to the mechanical transmission 16. The motor 26 may be variable displacement or fixed displacement. One skilled in the art will realize that the hydrostatic transmission 14 may also be embodied as an electric generator and electric motor, or other device capable of providing input power, without departing from the scope of the present invention.

The mechanical transmission 16 includes a planetary arrangement 30, first and second output members 32 and 34, first, second, and third synchronizing assemblies, or synchronizers, 36, 38, and 39 and first and second disc clutch assemblies 40 and 42. It is noted that although the illustrated embodiments show the use of synchronizers 36, 38, and 39, it is anticipated that the synchronizers 36, 38, and 39 may be substituted for other known engaging means, such as friction disc type clutches.

The planetary arrangement 30 includes first and second axially aligned planetary gear sets 44 and 46, and a planetary output shaft 48. Each planetary gear set 44 and 46 includes a sun gear 50, a carrier 52, and a ring gear 54, as is customary. The planetary output shaft 48 includes an internal shaft 56 and a sleeve 58, such as a hollow member or hub, which is supported by the internal shaft 56. Both the internal shaft 56 and the sleeve 58 exist in axial alignment with each other. The internal shaft 56 connects to the sun gears 50 of the first and second planetary gear sets 44 and 46. The sleeve 58 outputs from the carrier 52 of the second planetary gear set 46 through a first planetary output gear 60. The internal shaft 56 outputs from the sun gears 50 of the first and second planetary gear sets 44 and 46 through a second planetary output gear 62 and through an auxiliary drive gear 63. The first and second planetary output gears 60 and 62 are fixed to the planetary output shaft 48, while the auxiliary drive gear 63 rotates thereon.

The first and second output members 32 and 34 are positioned parallel to the input member 18 and the planetary arrangement 30. The first output member 32 includes a first low-speed reduction gear 64 and a first high-speed reduction gear 66. The second output member 34 includes a second low-speed reduction gear 68 and a second high-speed reduction gear 70.

The first and second synchronizers 36 and 38 are fixed to first and second hubs, or rotating members 72 and 74, respectively, and operate to rotate about the corresponding first or second output member 32 and 34 on at least one bearing or the like (not shown). The first and second synchronizers 36 and 38 are three-position synchronizers adapted to move from a neutral position to either of two positions, dependent on a preferred speed and direction. The third synchronizer 39 is fixed to the internal shaft 56 of the planetary output shaft 48, permanently, or through a coupling such as a spline, and moves from a neutral position to an engaged position.

Each rotating member 72 and 74 includes a rotatable clutch disc 78 and 80 fixed to an end of the rotating member 72 and 74, which may be "clutched" or selectively retained by an engaging clutch hub 82 and 84, which generally overlays the clutch disc 78 and 80, as is customary. A relatively small distance separates the clutch discs 78 and 80 from the respective clutch hubs 82 and 84. Together, the clutch discs 78 and 80 and clutch hubs 82 and 84 embody the first and second clutch assemblies 40 and 42. In one embodiment, the clutch assemblies 40 and 42 are known hydraulically-engaged and spring-disengaged rotating frictional clutch assemblies which may be selectively engaged to connect one of the first or second output members 32 and 34 to a final output member 86.

The low-speed and high-speed reduction gears 64, 66, 68, and 70 are configured to freely rotate about the first and second output members 32 and 34 while disengaged. Roller bearings (not shown) on the first and second output members 32 and 34 support the low-speed and high-speed reduction gears 64, 66, 68, and 70. When either of the first or second synchronizers 36 and 38 is engaged with either of the low-speed or high-speed reduction gears 64, 66, 68, and 70, the first or second rotating member 72 and 74 rotates at the same revolutions per unit of time as the engaged low-speed or high-speed reduction gear 64, 66, 68, and 70. Likewise, when the third synchronizer 39 is engaged with the auxiliary drive gear 63, the auxiliary drive gear 63 rotates at the same speed as the internal shaft 56 of the planetary output shaft 48, which drives an auxiliary output gear 87, which is fixed to the first output member 32.

First and second output shaft gears 94 and 96 fixed to the first and second output members 32 and 34 intermesh a final drive gear 98 of the final output member 86.

As is customary, the input member 18, planetary output shaft 48, first and second output members 32 and 34, and final output member 86 are supported within a transmission housing (not shown) and rotate about bearings, or the like, (not shown) held within the housing.

Figure 4:
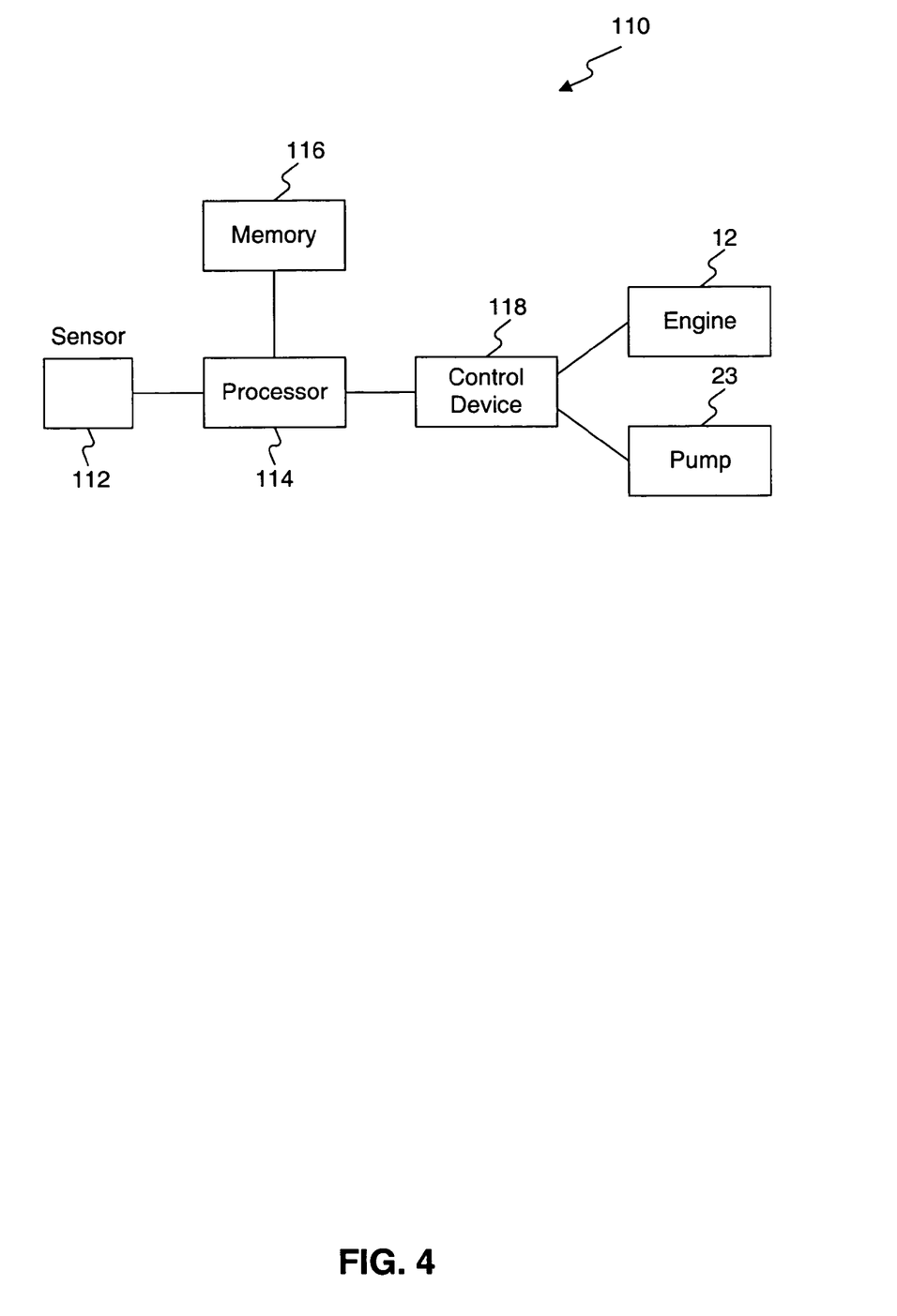
FIG. 4 is a schematic view of a control system of the hydromechanical transmission of FIG. 2.

FIG. 4 illustrates a schematic view of an exemplary control system 110 for the transmission 10. A temperature sensor 112 is provided for monitoring the oil temperature, e.g., near the variator and upstream along an oil supply line for the pump 23. Signals indicating the oil temperature are transmitted from the temperature sensor 112 to a device for monitoring an oil warming rate, such as a processor 114 connected to a memory 116.

The processor 114 may be connected to a control device 118 for sending signals or commands to various components of the transmission 10, e.g., the pump 23 and the engine 12, in response to the oil temperature signal received from the processor 114. For example, the control device 118 may send a signal to the engine 12 to increase an engine speed. The control device 118 may send a signal to the pump 23, which rotates with the engine 12, to increase a pump displacement.

The memory 116 may store data relating to the increment by which engine speed or pump displacement is increased. The memory 116 may also store data for determining a maximum value for increasing the engine speed without damaging the transmission (or highest safe engine speed, vsafe), a maximum value for increasing the pump displacement without damaging the transmission (or highest safe pump displacement, dsafe), a viscosity versus temperature mapping, e.g., a table or graph, (not shown), a safe pump displacement versus viscosity mapping (not shown), and/or other data. The viscosity versus temperature mapping may be determined based on the type of oil used in the transmission, and the safe pump displacement versus viscosity mapping may be determined experimentally. The control device 118 may send a signal to the pump 23 to increase the pump displacement by an amount determined using this stored data. The control device 118 may also send a signal to the engine 12 to increase the engine speed by an amount determined using this stored data. The memory 116 can also be used to store variables such as a threshold or final temperature (Tf) and/or a time limit (tf) that may be used to determine when to end the oil warming strategy and to begin normal operations of the work machine 8, a minimum increment for increasing pump displacement (dmin), a minimum increment for increasing engine speed (vmin). The data stored in the memory 116 can be updated based on new experimental determinations or based on changes in the type of oil used in the transmission.

INDUSTRIAL APPLICABILITY

The disclosed oil warming strategy may be applicable to any work machine that includes a transmission such as a continuously variable or hydromechanical transmission. The disclosed oil warming strategy allows oil in the transmission 10 to be warmed and accelerates the warming process before stroking to maximum displacement the pump 23 that drives the motor 26 in the hydrostatic transmission 14. The operation of the transmission 10 under this exemplary oil warming strategy will now be explained.

Figure 5:
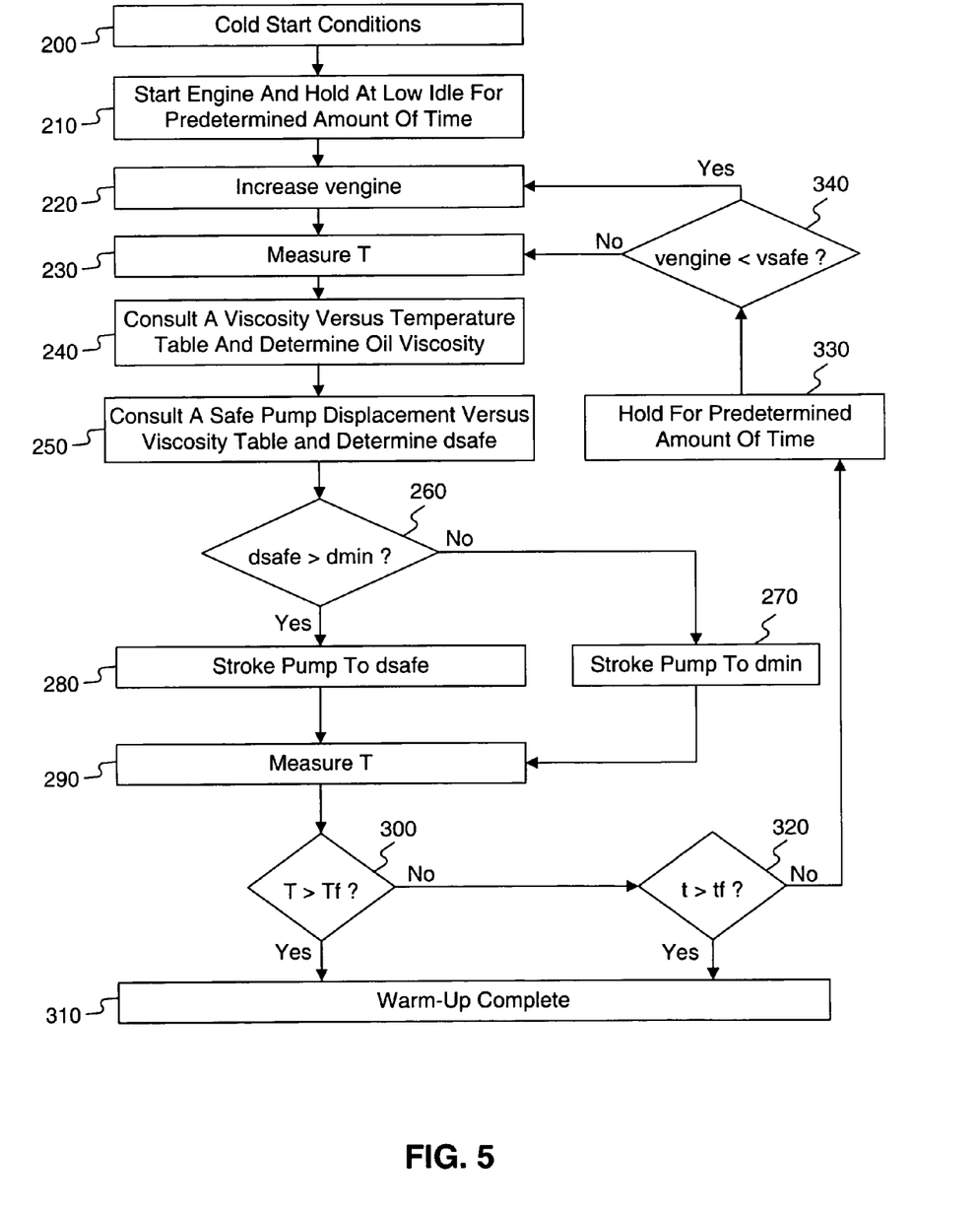
FIG. 5 is a flow chart illustrating an exemplary disclosed oil warming strategy for the hydromechanical transmission of FIG. 2.

FIG. 5 illustrates an exemplary flow chart of the exemplary oil warming strategy. Under cold start conditions the pump 23 (FIG. 2) is at zero displacement, the engine 12 produces zero output, and the oil in the transmission 10 is generally at a low temperature (Step 200). Optionally, at this point, the temperature sensor 112 may be used to measure the temperature of the oil to determine if the temperature is below the threshold value (Tf) before proceeding.

As shown in FIG. 3, the first and second synchronizers 36, 38 engage the first and second low-speed reduction gears 64, 68, respectively, and the engine speed is increased so that engine 12 may idle at a low speed (Step 210) while the pump 23 rotates at zero displacement. The engine 12 drives the input member 18, and the input member 18 delivers split input power to the hydrostatic transmission 14 and the planetary arrangement 30. Specifically, the first and second fixed input gears 20 and 22 simultaneously rotate upon rotation of the input member 18 and transfer power through the hydrostatic transmission input gear 24 and a first planetary input gear 102.

While the engine 12 is operating at low idle speed, the pump 23 uses the split input power to rotate at zero displacement and therefore does not displace any volume. As a result, power is not transferred to the motor 26. Power is also not transferred to the hydrostatic output gear 28 and a second planetary input gear 104.

The split input power that is transmitted to the planetary arrangement 30 provides hydromechanical output power, indicated by arrow 100, that outputs through the internal shaft 56 connected to the sun gears 50 of the first and second planetary gear sets 44 and 46, and through the sleeve 58, connected to the planet carrier 52 of the second planetary gear set 46. The second planetary output gear 62 intermeshes the second high-speed reduction gear 70, which drives the first high-speed reduction gear 66. Accordingly, as the second planetary output gear 62 rotates, the high-speed reduction gears 66, 70 also rotate. Likewise, the first planetary output gear 60 intermeshes the first low-speed reduction gear 64, which drives the second low-speed reduction gear 68. Accordingly, as the first planetary output gear 60 rotates, the low-speed reduction gears 64 and 68 also rotate.

The first synchronizer 36 operates to engage the first low-speed reduction gear 64 to synchronize the speed, or revolutions per unit time, of the first rotating member 72 to the speed of the first low-speed reduction gear 64. In other words, to decrease relative speed, preferably to zero, between the first low-speed reduction gear 64 and the first rotating member 72. When the speed of the first low-speed reduction gear 64 and the speed of the first rotating member 72 are equal, or substantially equal, the first low-speed reduction gear 64 and the first rotating member 72 fully engage in a releasably locked position, as is known in the art.

At the same time, the second synchronizer 38 and the second low-speed reduction gear 68 are also in an engaged state, thereby synchronizing the second rotating member 74 with the speed of the second low-speed reduction gear 68. In other words, the second synchronizer 38 operates to decrease relative speed, preferably to zero, between the second low-speed reduction gear 68 and the second rotating member 74. When the speed of the second low-speed reduction gear 68 and speed of the second rotating member 74 are equal, or substantially equal, the second low-speed reduction gear 68 and the second rotating member 74 fully engage in a releasably locked position, as is well known in the art. Arrows 106 of FIG. 3 indicate the flow of power through the hydromechanical transmission.

Although the first and second synchronizers 36, 38 are both engaged so that the clutch discs 78 and 80 have a non-zero rotational speed, there is a net zero, or approximately zero, torque on the final output member 86 so that the work machine 8 may remain in a stationary, parked condition.

Both clutch assemblies 40 and 42 are disengaged so that the clutch hubs 82 and 84 are disengaged from the rotating clutch discs 78 and 80, respectively. The clutch discs 78 and 80 rotate with a non-zero velocity while the clutch hubs 82 and 84 are grounded, thereby maintaining a non-zero clutch relative velocity. A drag (or frictional) force is generated in the oil between the clutch discs 78 and 80 and stationary clutch hubs 82 and 84, and this drag force opposes the rotational motion of the clutch discs 78 and 80.

The drag force (and power) is higher when there is a higher clutch relative velocity. Therefore, there is incentive to increase the displacement of the pump 23 because the clutch relative velocity increases as the pump displacement increases, thereby generating higher drag force.

The drag force is higher when the distance between the clutch discs 78 and 80 and clutch hubs 82 and 84 is smaller. Since the gaps between the clutch discs 78 and 80 and respective clutch hubs 82 and 84 are small, a higher drag force is generated. Also, the drag force is generated in both clutch assemblies 40 and 42, thereby creating two locations for generating the drag force.

Heat is generated in both clutch assemblies 40 and 42 as a result of the application of the drag force on the oil in the clutch assemblies. The heated oil can circulate throughout the transmission, e.g., by using one or more pumps (not shown) that are driven by the engine 12. Therefore, unheated oil is continually replenished between the clutch discs 78 and 80 and clutch hubs 82 and 84, and after being heated, the oil circulates away from the clutch assemblies 40 and 42, e.g., toward the hydrostatic transmission 14. Also, oil is circulated and warmed by the various rotating gears in the transmission 10.

Although the clutch hubs 82 and 84 are disengaged from the corresponding clutch discs 78 and 80, a drag torque may be transmitted from the rotating clutch discs 78 and 80 to the clutch hubs 82 and 84. The drag torque may be produced in response to the drag force acting on the oil and urges the clutch hubs 82 and 84 in the direction of rotation of the corresponding clutch discs 78 and 80.

When the clutch hubs 82 and 84 are urged into motion by the corresponding clutch discs 78 and 80, rotational motion may be transmitted from the rotating members 72 and 74 to the output members 32 and 34. The output shaft gears 94 and 96 and the ends of the corresponding output members 32 and 34 intermesh with the final drive gear 98, and the final drive gear 98 outputs through the final output member 86 to the wheels or tracks. However, since the rotational forces produced by the drag torque acting on the clutch hubs 82 and 84 are in approximately equal and opposite directions, as described below, these forces produce a net torque of zero, or approximately zero, on the final drive gear 98 and the final output member 86.

The first and second low-speed reduction gears 64 and 68 are meshed together and spin in opposite directions. The rotational speeds of the gears 64 and 68 are also equal or approximately equal, since the sizes of the gears 64 and 68 are equal or approximately equal. When the first and second synchronizers 36 and 38 engage with the first and second low-speed reduction gears 64 and 68, the rotational motion transferred to the clutch hubs 82 and 84 via the clutch discs 78 and 80 is equal, or approximately equal, and opposite.

Thus, the rotational motion transferred to the output members 32 and 34 and output shaft gears 94 and 96 is also equal, or approximately equal, and opposite. The output shaft gears 94 and 96 drivingly engage the final drive gear 98 in equal, or approximately equal, and opposite directions, and therefore, the net torque transmitted to the final drive gear 98 is zero, or approximately zero. A net zero, or approximately zero, torque is transmitted to the wheels or tracks (not shown). As a result, the oil is warmed while the engine 12 provides a non-zero output and the work machine 8 remains in a stationary, parked condition.

The oil warming rate may be accelerated by increasing the engine speed (vengine) after a predetermined amount of time, e.g., 15 seconds (Step 220). The engine speed may be increased by a reasonable predetermined increment (vmin), e.g., 200 revolutions per unit time. After this initial increase, the engine speed can be increased at regular time intervals, e.g., every 60 seconds, by reasonable predetermined amounts, e.g., 200 revolutions per unit time.

Alternatively, instead of, or in addition to, increasing the engine speed by a predetermined amount (vmin), the engine speed can be increased to a highest safe engine speed (vsafe), which is determined using a closed-loop method based on experimentally-derived data stored in the memory 116. For example, the highest safe engine speed may be determined as a function of time, oil temperature, or oil viscosity using a mapping stored in the memory 116. The engine speed value may be increased to match the highest safe engine speed value (vsafe) determined using the stored data.

Figure 6A:
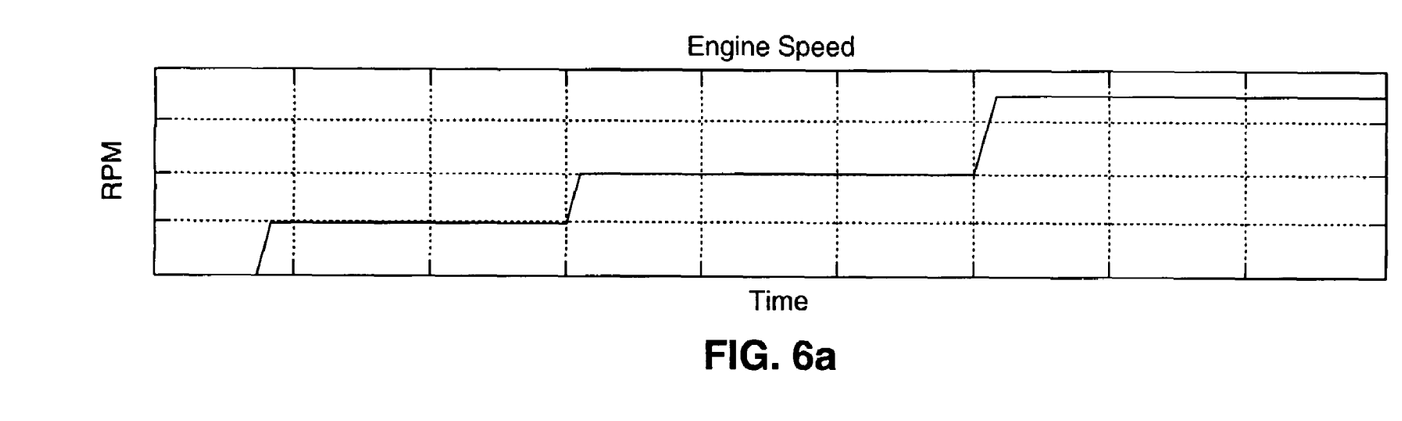
FIG. 6a is a graph illustrating engine speed versus time for an exemplary disclosed oil warming strategy for the hydromechanical transmission of FIG. 2.

FIG. 6a is a graph illustrating engine speed versus time for an exemplary disclosed oil warming strategy. The graph shows an example of how the engine speed can be stepped up over time.

By increasing the engine speed, more heat is generated in the clutch assemblies 40 and 42. When the engine speed increases, the relative velocity across the clutch assemblies 40 and 42 also increases. The rotational speeds of the clutch discs 78 and 80 increases with respect to the clutch hubs 82 and 84. Thus, greater drag forces are applied to the oil in the clutch assemblies 40 and 42, thereby creating more heat and accelerating the increase in oil temperature.

The process of warming the oil can also be accelerated by displacing the pump 23 from its zero displacement position (Steps 230-280). After the engine 12 has been at low idle for a predetermined amount of time, e.g., 15 seconds, the pump 23 can be displaced by a predetermined amount (dmin) to an intermediate position that is less than the maximum displacement (dmax), e.g., 20% displacement. After this initial increase in pump displacement, the pump displacement can be increased at regular time intervals, e.g., every 60 seconds.

Alternatively, instead of increasing the pump displacement by a predetermined amount (dmin), the pump 23 can be displaced to the highest safe pump displacement (dsafe) determined using a closed-loop method based on the data stored in the memory 116. The oil temperature is measured using the temperature sensor (Step 230). The highest safe pump displacement is determined from the measured oil temperature using the data stored in the memory 116. First, the oil viscosity is determined using the viscosity versus temperature mapping stored in the memory 116 (Step 240). Then, the highest safe pump displacement (dsafe) is determined using the safe pump displacement versus viscosity mapping stored in the memory 116 (Step 250).

The highest safe pump displacement value (dsafe) determined using the stored data is compared to the minimum pump displacement value (dmin) that is also stored in the memory (Step 260). For example, if the minimum pump displacement value (dmin) is 20% displacement and the highest safe pump displacement value (dsafe) is less than or equal to 20% displacement (dsafe$\leq$dmin), then the pump 23 is upstroked to 20% displacement (Step 270). However, if the safe pump displacement value is greater than 20% displacement (dsafe>dmin), then the pump is upstroked to the safe pump displacement value (Step 280).

The oil temperature (T) is measured using the temperature sensor 112 (Step 290). If the temperature is greater than or equal to a predetermined final temperature (T$\geq$Tf), then the oil warming strategy is complete (Steps 300 and 310). If the temperature is less than the predetermined final temperature (T<Tf), then it is determined whether the time limit has been exceeded (t$\geq$tf), e.g., 3 minutes (Step 320). If 3 minutes has elapsed since the warm-up started (t$\geq$tf), then the oil warming strategy is complete (Step 310).

However, if less than 3 minutes has elapsed since the engine was first powered (t<tf), then the transmission 10 continues running at its current state for a predetermined amount of time, e.g., until 60 seconds has passed since the warm-up started (Step 330).

Then, the engine speed (vengine) may be compared to the highest safe engine speed (vsafe) determined in Step 220 (Step 340). If the engine speed (vengine) is less than the highest safe engine speed (vsafe), then both the engine speed and the pump displacement are increased, as set forth in Steps 220-280. However, if the engine speed (vengine) is greater than or equal to the highest safe engine speed (vsafe), then the pump displacement is increased, as set forth in Steps 230-280.

Thus, this is a "closed-loop" method because, as the oil warms, the engine speed and/or the pump displacement is increased incrementally until the oil temperature reaches the final temperature.

Figure 6B:
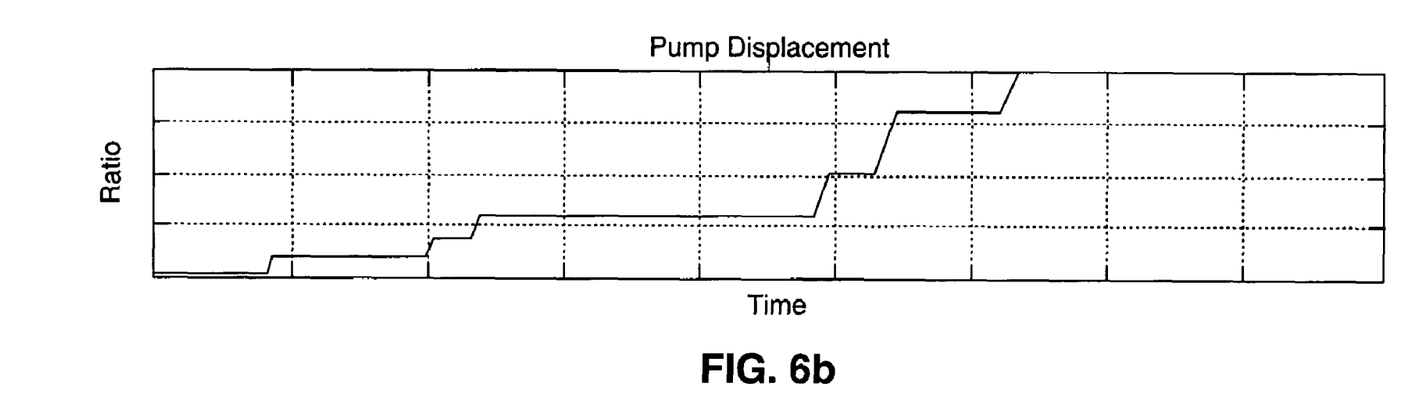
FIG. 6b is a graph illustrating pump displacement versus time for an exemplary disclosed oil warming strategy for the hydromechanical transmission of FIG. 2.

FIG. 6b is a graph illustrating pump displacement versus time for an exemplary disclosed oil warming strategy. The graph shows how the pump displacement can be stepped over time, according to an embodiment of the invention.

When the pump is upstroked to a non-zero displacement, oil may be warmed at the hydrostatic transmission 14. At a non-zero displacement, the pump 23 uses the split input power from the input member 18 to fluidly drive the motor 26 to convert the input power from the engine 12 to hydrostatic output power over a continuously variable speed ratio. Since the pump is rotating and displaced to the non-zero displacement, heat is generated in the hydrostatic transmission 14 and is transferred to the oil surrounding the hydrostatic transmission 14.

However, even though the motor produces hydrostatic output power, the work machine is still prevented from moving since the first and second synchronizers are both engaged and allow the clutch discs to rotate at approximately equal and opposite speeds, thereby creating a net zero torque on the final output member 86.

The hydrostatic transmission 14 outputs through the hydrostatic output gear 28 to the planetary arrangement 30. Specifically, the hydrostatic transmission 14 outputs through the hydrostatic output gear 28 to a second planetary input gear 104. The planetary arrangement 30 combines the hydrostatic output power from the second planetary input gear 104 with the split input mechanical power to provide hydromechanical output power for application to a load, such as one or more driving wheels of a vehicle, or tracks of an earth-working machine. The speed and torque of the planetary arrangement 30 can be infinitely varied by varying the stroke of the pump 23. When the pump 23 is at a non-zero displacement, greater speed and torque is applied to the planetary arrangement than when the pump 23 is at zero displacement, thereby generating more heat to transfer to the oil.

It is to be understood that the exemplary oil warming strategy can provide any combination of steps for increasing engine speed using predetermined increments or by using a closed-loop method and steps for increasing pump displacement using predetermined increments or by using a closed-loop method. The oil warming strategy may include only steps for increasing engine speed, or alternatively, only steps for increasing pump displacement.

Several advantages over the prior art may be associated with the exemplary oil warming strategy. The oil warming strategy allows heat to be transferred to the oil without requiring stroking the pump 23 to maximum displacement and without requiring full engagement of the clutch assemblies.

Since two synchronizers 36, 38 can be activated at the same time, the torque produced by the engine 12 is effectively split evenly between the two clutch assemblies having clutch discs 78, 80 that rotate in substantially equal and opposite directions. The oil warming strategy allows the oil in the transmission 10 to be warmed while the work machine 8 remains in a stationary, parked condition.

The oil may be warmed by increasing the engine speed and/or by increasing the pump displacement. To accelerate the warming process even more, both the engine speed and the pump displacement can be increased. An increase in engine speed results in an increase in relative clutch velocity and increased drag force between the clutch hubs 82, 84 and clutch discs 78, 80. However, the increase in engine speed is limited by a maximum safe engine speed for preventing damage to the transmission 10. An increase in pump displacement results in an increased motor speed.

The oil warming strategy can be implemented automatically using a closed-loop method, requiring minimal user interaction. Commands send to the engine 12 or pump 23 for increasing the respective engine speed or the pump displacement may be generated based on a predetermined strategy, e.g., by a fixed amount or an amount determined using a mapping of engine speed or pump displacement as a function of a measured oil temperature or viscosity. The mapping can be determined by experimental data on the highest safe engine speeds and pump displacements as a function of a measured temperature or viscosity of the oil in the transmission 10.

Furthermore, the oil warming strategy is capable of stopping automatically when the final temperature is reached. Therefore, this strategy can be used regardless of the temperature of the oil under the cold start conditions.

Heat may be generated in both clutch assemblies 78, 80, 82, 84 and in the hydrostatic transmission 14, thereby increasing the rate at which the oil is warmed in the transmission 10 and decreasing the length of time required for the oil to warm up to the final temperature. The moving gears in the transmission 10 also serve to increase the heat generated. Furthermore, higher pump displacements not only increase clutch drag power, but also increase variator power loss (losses in the pump 23 and the motor 26), thereby generating additional heat. The variator power loss loads the engine 12, which generates more heat.

Since the clutch discs 78, 80 rotate at approximately equal and opposite rotational speeds, a zero net torque is delivered to the output member 86, thereby allowing the work machine 8 to remain in a stationary, parked condition.

Thus, the oil warming process may be accelerated while requiring minimal user interaction. Since the user does not have to wait as long for the oil to warm up to begin normal operations of the work machine 8, user convenience is increased.

It will be apparent to those skilled in the art that various modifications and variations can be made in the disclosed transmission without departing from the scope or spirit of the disclosure. Other embodiments of the disclosure will be apparent to those skilled in the art from consideration of the specification and practice of the disclosure herein. It is intended that the specification and examples be considered as exemplary only.

What is claimed is:

1. A method for increasing a temperature of oil in a continuously variable transmission during engine start-up, the transmission including a fluid pump and motor, and a mechanical transmission, the method comprising:
   starting the engine;
   maintaining the fluid pump at substantially zero displacement;
   heating the transmission oil by relative rotation of a first clutch disc and first clutch hub of a first clutch assembly and by relative rotation of a second clutch disc and second clutch hub of a second clutch assembly; and
   maintaining a substantially zero net torque from the transmission during the heating of the oil by the first and second clutch assemblies.

2. The method of claim 1, further comprising:
   increasing a speed of the engine after a predetermined condition is met; and
   maintaining the heating of the transmission oil by the clutch assemblies and the substantially net zero torque of the transmission after the increasing of the speed of the engine.

3. The method of claim 2, further comprising:
   measuring a temperature of the transmission oil, the predetermined condition including the measured temperature of the transmission oil being above a threshold temperature.

4. The method of claim 2, wherein the predetermined condition includes a time limit.

5. The method of claim 2, further comprising:
   incrementally increasing the speed of the engine; and
   maintaining the heating of the transmission oil by the clutch assemblies and the substantially net zero torque of the transmission after each increase of the speed of the engine.

6. The method of claim 5, further comprising:
   operating the fluid pump at substantially maximum displacement and operating the transmission at a substantially non-zero torque when the transmission oil reaches a threshold temperature.

7. The method of claim 1, further comprising:
   increasing a displacement of the fluid pump after a predetermined condition is met; and
   maintaining the heating of the transmission oil by the clutch assemblies and the substantially net zero torque of the transmission after the increasing of the displacement of the pump.

8. The method of claim 7, wherein the predetermined condition includes a time limit.

9. The method of claim 7, further comprising:
incrementally increasing the displacement of the fluid pump; and
maintaining the heating of the transmission oil by the clutch assemblies and the substantially net zero torque of the transmission after each increase of the displacement of the pump.

10. The method of claim 9, further comprising:
operating the fluid pump at substantially maximum displacement and operating the transmission at a substantially non-zero torque when the transmission oil reaches a threshold temperature.

11. The method of claim 7, further comprising:
measuring a temperature of the transmission oil, the predetermined condition including the measured temperature of the transmission oil being above a threshold temperature.

12. The method of claim 11, wherein the increasing of the displacement of the fluid pump includes increasing the displacement to a highest safe displacement based on stored data and the temperature of the transmission oil.

13. The method of claim 12, wherein the highest safe pump displacement is a function of an approximated viscosity of the oil.

14. The method of claim 1, further comprising:
increasing a speed of the engine after a first predetermined condition is met;
maintaining the heating of the transmission oil by the clutch assemblies and the substantially net zero torque of the transmission after the increasing of the speed of the engine;
increasing a displacement of the pump after a second predetermined condition is met; and
maintaining the heating of the transmission oil by the clutch assemblies and the substantially net zero torque of the transmission after the increasing of the displacement of the pump.

15. The method of claim 14, wherein the first predetermined condition includes at least one of a transmission oil temperature threshold and time limit, and the second predetermined condition includes at least one of a transmission oil temperature threshold and time limit.

16. A method for increasing a temperature of oil in a continuously variable transmission during engine start-up, the transmission including a fluid pump and motor, and a mechanical transmission, the method comprising:
starting the engine;
incrementally increasing the displacement of the fluid pump in response to a first set of predetermined conditions;
incrementally increasing the speed of the engine in response to a second set of predetermined conditions; and
maintaining a substantially zero net torque from the transmission during the incremental increasing of the displacement of the fluid pump and speed of the engine.

17. The method of claim 16, wherein the first set of predetermined conditions include a set of threshold temperatures of the transmission oil.

18. The method of claim 17, wherein the second set of predetermined conditions includes a set of threshold temperatures of the transmission oil.

19. The method of claim 16, further comprising:
operating the fluid pump at substantially maximum displacement and operating the transmission at a substantially non-zero torque when the transmission oil reaches a threshold temperature.

* * * * *